May 29, 1951     J. D. TYSON     2,555,256
PIPE-LINE PIPE
Filed April 14, 1948
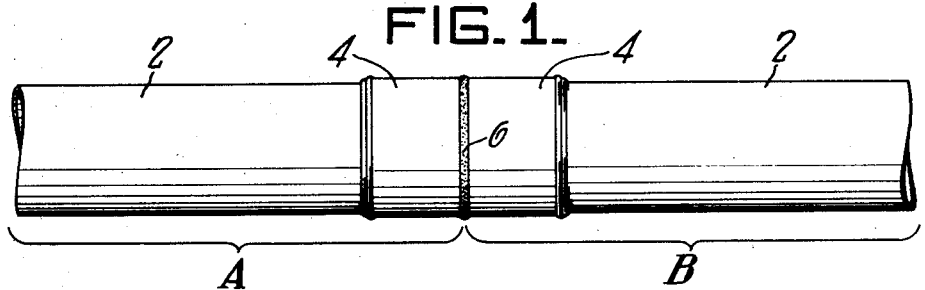
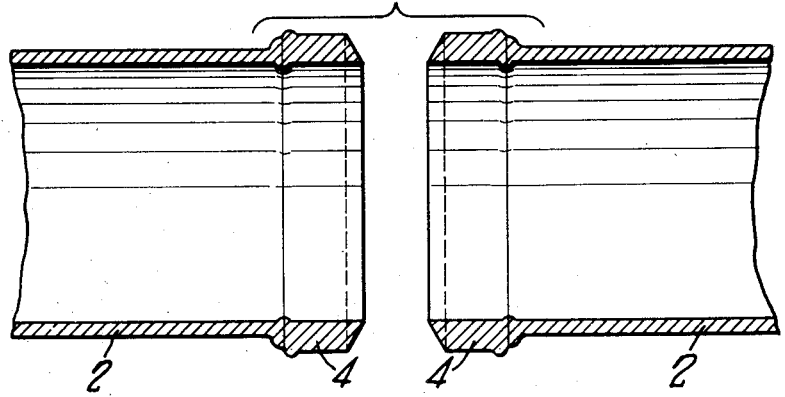
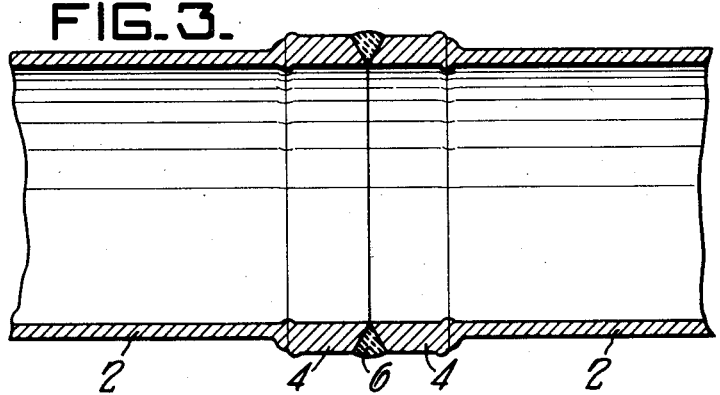
Inventor:
JOHN D. TYSON,
by: Donald G. Dalton
his Attorney.

Patented May 29, 1951

2,555,256

UNITED STATES PATENT OFFICE 2,555,256

PIPE-LINE PIPE

John D. Tyson, Lorain, Ohio, assignor to National Tube Company, a corporation of New Jersey Application April 14, 1948, Serial No. 21,061

2 Claims. (Cl. 138—47)

1

This invention relates to pipe for line pipe and the like and more particularly to high-strength lightweight line pipe.

The amount of liquid or gaseous fluid that can be transported through pipe lines depends upon the operating pressures permitted therein. The permissable pressures are a function of the yield strength of the steel of which the pipe is composed in combination with its wall thickness. Since it is desirable for the pipe to have as light walls as possible for economy in transportation and ease of handling in the field, the high yield strengths desired are commonly obtained by increasing the alloying content of the steel from which the pipe is formed. This, however, entails the disadvantage of necessitating special welding requirements which cannot be readily met under field conditions. Line pipe is ordinarily welded by arc welding but with the increased carbon, manganese and other alloying constituents, it is necessary to preheat or post-heat the welded regions. Such equipment is not ordinarily in the field and, if so, materially increases the time required for laying pipe line which is undesirable for a number of reasons.

It is accordingly an object of the present invention to provide high-strength lightweight pipe line pipe which can be arc welded without the necessity of preheating or post-heating the weld regions.

It is a further object of the present invention to provide pipe line pipe formed of steel having sufficiently high yield strength to permit the use of light walls and which, at the same time, is readily weldable under field conditions.

The foregoing and further objects will be apparent from the following specification when read in conjunction with the attached drawing, wherein:

Figure 1 is a fragmentary view of two pipes embodying my invention disposed end to end and welded together;

Figure 2 is a longitudinal section of the two pipes of Figure 1 prior to welding and spaced apart; and Figure 3 is a longitudinal section of the joint region of Figure 1.

Referring more particularly to the drawing, the letters A and B designate a pair of pipes consisting of a body portion 2 and end portions 4 composed of rings welded thereto. In Figures 1 and 2, the pipes are shown joined together by a bead 6 deposited by arc welding. The body portion of the pipe is formed of steel containing sufficiently high alloy content to have a high yield strength, preferably in excess of 60,000 p. s. i. Such steel contains between .40 to .60 per cent carbon, 1.30 to 2 per cent manganese, .10 per cent maximum phosphorus, .05 per cent maximum sulphur, up to .5 per cent molybdenum, up to .3 per cent titanium, with the balance iron except for impurities and deoxidizing additions in common amounts. A preferred steel within this range contains .40 per cent carbon, 1.40 per cent manganese, .10 per cent maximum phosphorus, and .05 per cent maximum sulphur. Such steel permits the use of relatively thin walls and at the same time the use of the desired high operating pressures in the pipe line formed therefrom. Such steel cannot, however, be arc welded without either preheating or post-heating the weld region.

In accordance with the teachings of my invention, there is welded to the body portion of the pipe the end or ring portions 4 which are composed of steel having sufficiently low alloy content to permit arc welding thereof without preheating or post-heating the welded region. Such rings may suitably be composed of steel containing .20 to .30 per cent carbon, .35 to 1.25 per cent manganese, .045 per cent maximum phosphorus, .05 per cent maximum sulphur, .35 per cent maximum silicon, with the balance iron, except for impurities and deoxidizing additions in common amounts. A typical steel within this range contains .25 per cent carbon, .75 per cent manganese, .01 per cent phosphorus, .025 per cent sulphur, and .04 per cent silicon. This steel is readily weldable by arc welding and does not require either preheating or post-heating so that it can be readily welded under field condition. The yield strength is considerably lower than the steel of the body portion of the pipe being in the order of about 30,000 p. s. i. In order to overcome this low strength and provide end portions which have a yield strength comparable to or greater than that of the body portion, the rings as shown in Figures 2 and 3 are of considerably greater thickness than the body portion of the pipe. That is to say, the inside diameter of the ring is substantially the same as that of the body portion so as not to impede the flow of fluids therethrough, but the outside diameter is sufficiently greater than the body portion in order to provide a yield strength equivalent or greater than that of the body portion.

These rings or end portions are attached to the body portion at the mill whereby the desired welding technique including preheating or post-heating in the case of arc welding or pressure welding involving very close control of temperature may be employed. This results in a pipe with uniformly high yield strength from end to end with lightweight walls through the major portion thereof but, which at the same time, is suitable for field welding.

While I have shown and described one specific embodiment of my invention, it will be understood that this embodiment is merely for the purpose of illustration and description and that various other forms may be devised within the scope of my invention, as defined in the appended claims.

I claim:

1. A pipe line pipe comprising a body portion composed of steel containing between .40 and .60% carbon, 1.35 to 2% manganese, .10% maximum phosphorus, .05% maximum sulphur, 0 to .5% molybdenum, 0 to .3% titanium and the balance iron except for residual elements in common amounts, said portion due to said composition having a yield strength in excess of 60,000 p. s. i. and requiring heat treating before or after welding, and end portions welded thereto composed of steel containing between .20 to .30% carbon, .35 to 1.25% manganese, .045% maximum phosphorus, .05% maximum sulphur, .35% maximum silicon and balance iron except for residual impurities in common amounts, said steel due to the composition thereof being readily weldable without preheating or post heating when welding and having a materially lower yield strength than the steel of the body portion, said end portions having an inside diameter not less than the inside diameter of said body portion but being sufficiently thicker than the body portion to provide a yield strength equal to or greater than the yield strength of the body portion.

2. A pipe line formed of sections of line pipe welded end to end, each of said sections comprising a body portion composed of steel containing between .40 and .60% carbon, 1.35 to 2% manganese, .10% maximum phosphorus, .05% maximum sulphur, 0 to .5% molybdenum, 0 to .3% titanium and the balance iron except for residual elements in common amounts, said portion due to said composition having a yield strength in excess of 60,000 p. s. i. and requiring heat treating before or after welding, and end portions welded thereto composed of steel containing between .20 to .30% carbon, .35 to 1.25% manganese, .045% maximum phosphorus, .05% maximum sulphur, .35% maximum silicon and balance iron except for residual impurities in common amounts, said steel due to the composition thereof being readily weldable without preheating or post heating when welding and having a materially lower yield strength than the steel of the body portion, said end portions having an inside diameter not less than the inside diameter of said body portion but being sufficiently thicker than the body portion to provide a yield strength equal to or greater than the yield strength of the body portion.

JOHN D. TYSON.

REFERENCES CITED

The following references are of record in the file of this patent:

UNITED STATES PATENTS

| Number | Name | Date |
|---|---|---|
| 2,308,307 | Robinson | Jan. 12, 1943 |
| 2,396,704 | Kerr | Mar. 19, 1946 |

OTHER REFERENCES

Welding Encyclopedia, Eleventh Edition, page 466. Published in 1943 by the Welding Engineer Publishing Co., Chicago, Illinois.